Feb. 20, 1968    E. D. CONNER    3,369,613
CULTIVATOR

Filed June 8, 1965    3 Sheets-Sheet 1

INVENTOR.
EDWARD D. CONNER
BY
*Keith D. Beecher*
ATTORNEY

Feb. 20, 1968     E. D. CONNER     3,369,613

CULTIVATOR

Filed June 8, 1965     3 Sheets-Sheet 2

3,369,613
CULTIVATOR
Edward D. Conner, 2700 Peterson Way, Apt. 9A,
Costa Mesa, Calif. 92626
Filed June 8, 1965, Ser. No. 462,273
4 Claims. (Cl. 172—93)

ABSTRACT OF THE DISCLOSURE

An improved agricultural instrument as described in the specification, which is used for weeding and loosening the soil around a growing stalked crop, such as cotton. The cultivator includes a head which has a series of hoe-like fingers mounted on it, the fingers being movable around the head as the implement is driven along a path adjacent a row of the crop. The hoe-like fingers are controlled so that they are caused to enter and leave the row of the crop essentially at right angles to the row, and are movable down into the soil, so as to perform the weeding and cultivating function.

---

The present invention relates to agricultural implements of the general type described and claimed in co-pending application Ser. No. 427,770, filed Jan. 25, 1965, in the name of the present inventor, and which has now issued as Patent 3,323,599, June 6, 1967.

The invention relates more particularly to a simplified agricultural implement of the above-mentioned general type, and which has particular utility in weeding and loosening the soil around a growing sturdy-stalked crop, such as cotton.

As in the case of the copending application, the cultivator of the present invention includes a head having a plurality of hoe-like fingers mounted thereon, the fingers being movable around the head, and about a generally vertical axis, as the agricultural implement is moved along a path.

The hoe-like fingers referred to above are controlled so that, as they move around the head, they turn about their individual axes a predetermined amount. This control is in a selective manner, so that the fingers are caused to enter and leave the row of crops essentially at right angles to the row, as the agricultural implement is drawn along a path adjacent the row.

Furthermore, the hoe-like fingers are controlled to move linearly and reciprocally along their individual axes, in a selective manner. This latter motion is such that each finger is caused to move down into the soil after it has entered the row between adjacent stalks of the crop. Then, when each finger is withdrawn from the row, it loosens the soil and also draws out any weeds that may be growing between the stalks.

As was the case with the cultivator of the copending application Ser. No. 427,770, the implement of this application is constructed to be used in conjunction, for example, with sturdy-stalked crops. The aforesaid hoe-like fingers are supported on the head in a manner such that should a finger contact a stalk of the crop upon entering the row, the finger is deflected so that the finger may move to one side of the stalk. Then, the subsequent downward movement of the particular finger into the soil, and the subsequent withdrawal of the finger, causes it to loosen the soil and to remove any weeds, without damage to the crop itself.

An object of the present invention is to provide an improved agricultural implement, in the form of a cultivator, which is capable of weeding and cultivating sturdy-stalked crops without interfering in any manner with the crops, or damaging the same.

Another object of the invention is to provide such as improved cultivator which may be operated as a usual adjunct to a farm tractor, or the like, and which is capable of performing its cultivating function easily and efficiently, and without the need for any particular skill on the part of the operator.

A still further object of the invention is to provide such an improved cultivator which is simple in its construction so as to be relatively low in cost, and which is relatively easy and inexpensive to maintain.

Yet a further object of the invention is to provide such an improved cultivator type of agricultural implement which is rugged and sturdy in its construction, and which is capable of long and trouble-free operation.

Other objects and advantages of the invention will become apparent from a consideration of the following description, when the description is taken in conjunction with the accompanying drawings, in which:

FIGURE 1 is a top plan view of an agricultural implement, constructed in accordance with the invention, and of a form suitable to be drawn by a tractor, or the like;

Figure 1:
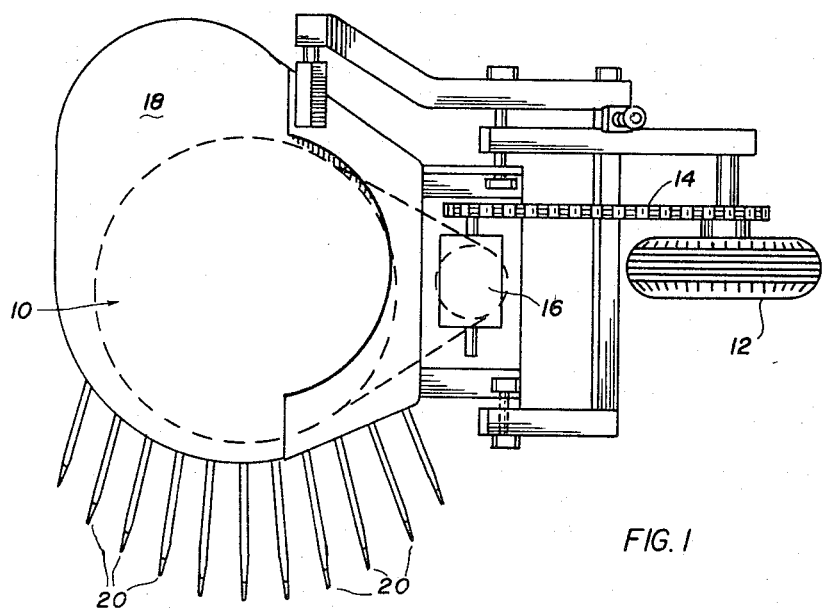
Figure 2:
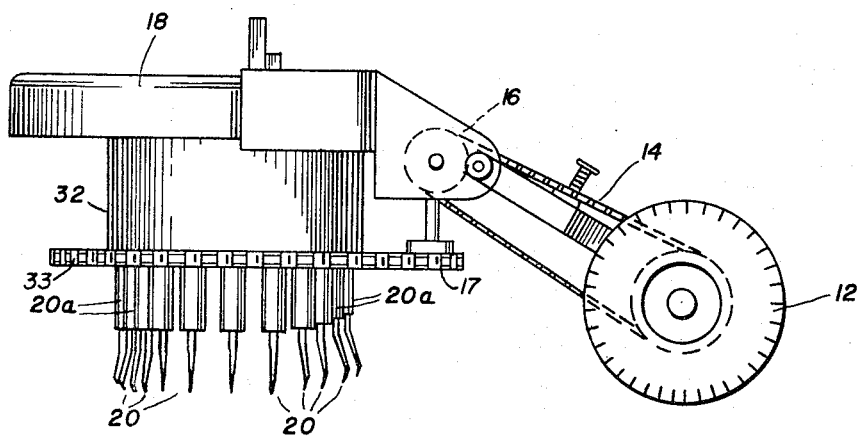
FIGURE 2 is a side elevational view of the tractor of FIGURE 1.

The agricultural implement of the invention is designated generally as 10 in FIGURES 1 and 2. The implement in FIGURE 1, for example, may be coupled to a tractor and drawn to the left in FIGURES 1 and 2. The implement includes a usual gauge wheel 12 which normally holds the implement at a desired height, as it is drawn down the row of crops.

In the illustrated embodiment, the gauge wheel 12 is coupled by means of a chain drive 14 to a drive mechanism 16. The drive mechanism 16, in turn, is coupled to a cultivator head 18 by means of a chain 17, belt, gear, or any other appropriate drive.

The cultivator head 18, as will be described, includes a stationary portion and a rotatable portion. The rotatable portion is driven by the drive 16, so that it rotates about the stationary portion, around a generally vertical axis.

Figure 4:
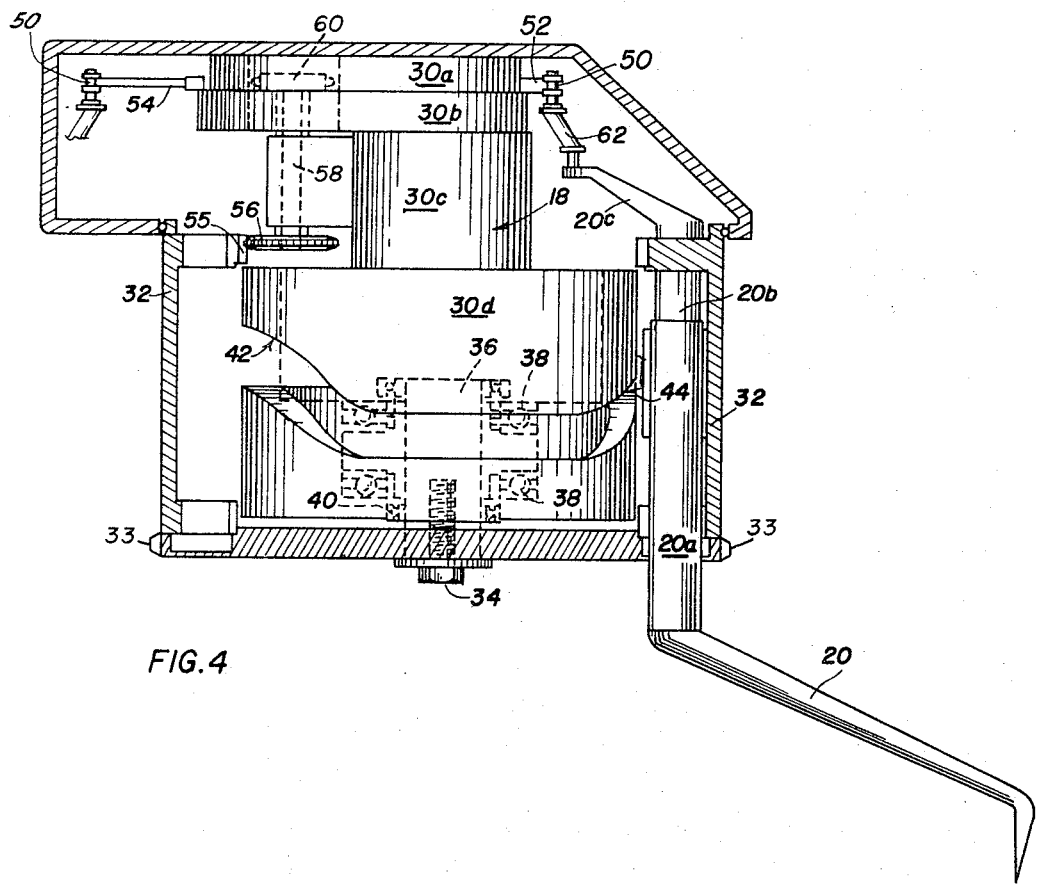
FIGURE 4 is a side sectional view of the head assembly, showing details of the internal components.
Figure 5:
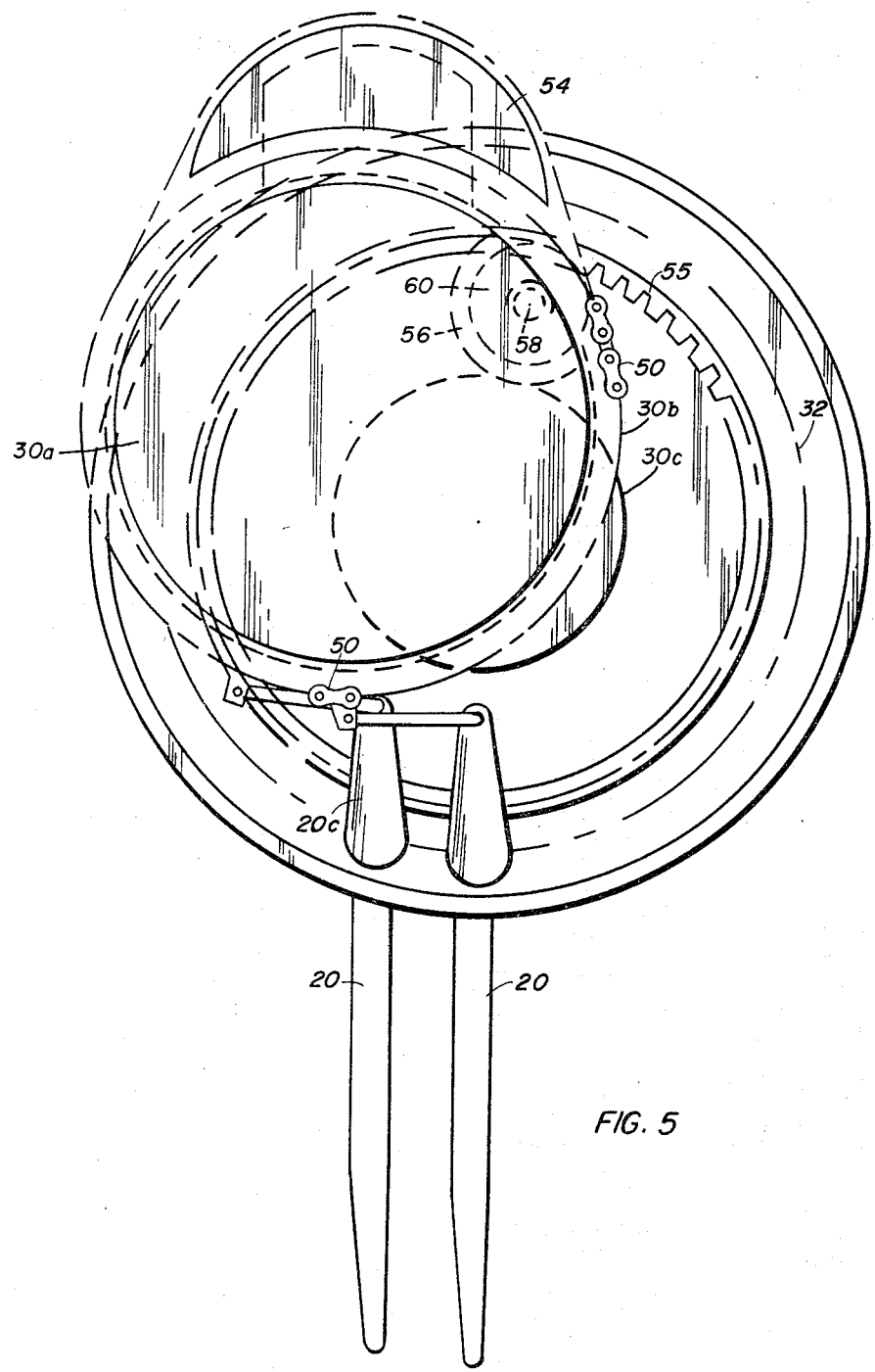
FIGURE 5 is a top view of the head assembly, with the cover removed so as to reveal other operating components.

A plurality of radial hoe-like fingers 20 are mounted on the movable portion of the head, as best shown, for example, in FIGURE 4. These fingers 20 are controlled, so that as the movable portion of the head 18 rotates about the generally vertical axis, the fingers turn with the head, and also rotate about their own individual vertical axes.

Figure 3:
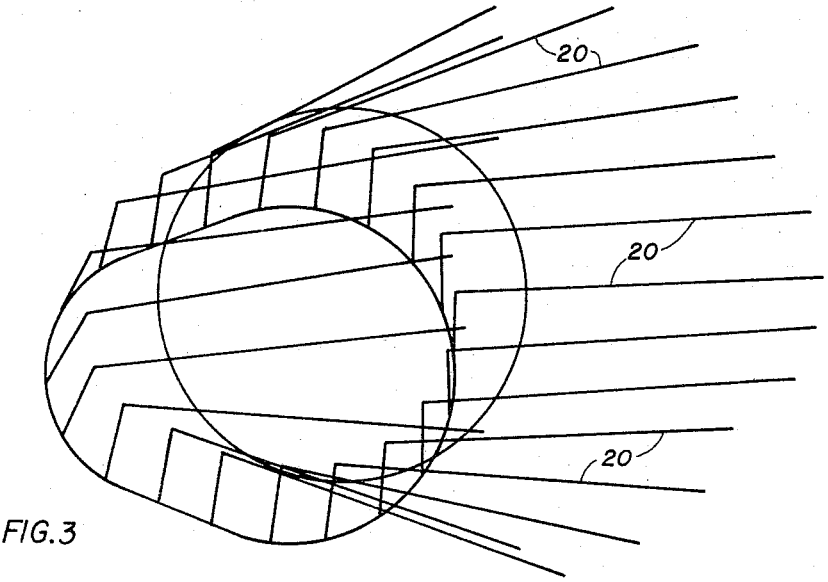
FIGURE 3 is a schematic plan view, showing the manner in which the hoe-like fingers on the cultivator head rotate about the head, as the implement is moved.

Therefore, as the implement is moved, for example, towards the top of the sheet in FIGURE 3, and as the hoe-like fingers 20 and movable portion of the head 18 rotate, the fingers describe the paths shown in FIGURE 3. The fingers to the right of FIGURE 3, for example, are fully extended into the row of crops, and the movement of the fingers with respect to the row is such that essentially reciprocal movement along an axis perpendicular to the row is achieved.

At the same time, the fingers are moved to their lowermost position, shown in FIGURE 2, after they have been extended to their positions shown in the right of FIGURE 3, so that as they are withdrawn, they draw weeds with them, and pulverize the soil.

The head 18 shown in FIGURE 4 includes a stationary portion having sections designated 30a, 30b, 30c and 30d. Each section of the stationary portion has an essentially circular cross-section. The head 18 also includes a movable portion 32 which is mounted on the stationary portion, and which is movable about the stationary portion by means of a gear 33 which is engaged by the aforesaid drive chain 17, around an essentially vertical axis.

The movable portion 32 is mounted on the stationary portion by means, for example, of a bolt 34 which extends into a shaft 36. The shaft 36 is supported in bearings 38 and in thrust bearings 40 in the section 30d of the stationary portion.

The hoe-like fingers 20 are supported in the movable portion 32 of the head 18 in the manner shown in FIGURE 4. Each finger 20 includes a hollow sleeve 20a which is rotatably and slidably mounted in the movable portion 32. In addition, each finger includes a shaft-like portion 20b which is rotatably mounted in the movable portion 32 of the head 18, and which extends into the sleeve portion 20a in telescopic relationship.

A cam track 42 extends around the periphery of the stationary section 30d. Each of the sleeve portions 20a of the fingers 20 includes a cam follower 44 which extends into cam track 42. Then, as the movable portion 32 is moved around the stationary portion 30d of the head 18, the cam followers 44 cause the fingers 20 selectively to move to a lower position, as they move around the cam track 42. This lower position is selected to occur when the corresponding fingers are in fully extended positions in the row of crops, and just prior to the particular fingers being successively withdrawn from the row.

A chain 50 extends around the section 30a for movement around that section. The chain is mounted adjacent the section 30a on a rotatable member 52. The chain moves with the rotatable member 52, and around a stationary extended member 54 which is affixed to the section 30b, so that the chain will have the desired trajectory, so as to provide the desired rotational movement to the individual fingers 20.

The movable portion 32 has an internal gear 55 which engages a gear 56. The gear 56 is mounted on a rotatable shaft 58 supported on the stationary section 30c and extending vertically into the stationary section 30b. A further gear 60 is mounted on the upper end of the drive shaft 58, and it engages the chain 50, so as to move the chain about the section 30a and about the stationary extension 54.

The upper end of each of the hoe-like fingers 20 includes a crank portion 20c which is integral with the shaft 20b, and a coupling pin 62 couples the extremity of the crank 20c to the chain 50. Then, as the chain 50 is moved around the section 30a and around the extension 54, it draws the fingers 20 in a manner such that they are caused to rotate selectively about their individual vertical axes. This is so that the motion depicted in FIGURE 3 may be realized.

At the same time, the cam followers 44 of the respective hoe-like fingers 20, causes the sleeves 20a and the lower protruding portions of the fingers, to move selectively downwardly into the soil, so that the mechanism may properly perform its cultivating function.

It will be appreciated that a pair of cultivator heads, such as shown in FIGURES 1 and 2, may be used, one on each side of the row, so that full cultivation of the row may be achieved by a single pass.

The invention provides, therefore, a simplified and improved mechanism, whereby mechanical cultivating of a crop may be achieved in a simple manner, and by means of a mechanism which is relatively easy to operate.

The feature of the cultivator of the invention is that the hoe-like cultivator fingers 20 are so controlled that they are moved in and out of the row of crops, with relatively no sidewise motion, and essentially perpendicular to the line of the row. Also, the cultivator fingers are selectively moved up and down, so that they will be moved into the soil at the proper time, in order to perform their desired weeding and soil pulverizing function.

While a particular embodiment of the invention has been shown and described, modifications may be made. It is intended in the claims to cover all modifications which come within the scope of the invention.

What is claimed is:

1. An agricultural implement for cultivating a row of crops, including: a head having a stationary portion, and having a movable portion mounted on said stationary portion for movement around said stationary portion about a generally vertical axis; a plurality of hoe-shaped cultivator fingers mounted on said movable portion for rotation about their individual longitudinal axes and for reciprocal linear movement along said longitudinal axes; first means coupling said fingers to said stationary portion to provide selective linear reciprocal movement to said fingers along said longitudinal axes as said movable portion is moved around said stationary portion; a chain mounted on said stationary portion and extending around the periphery thereof for movement around said stationary portion; drive means mounted in said stationary portion and coupled to said movable portion and to said chain for moving said chain around said stationary portion as said movable portion is moved about said generally vertical axis; and second means coupling said fingers to said chain to produce selective rotational movement to said fingers about said individual longitudinal axes as said movable portion is moved about said generally vertical axis.

2. The agricultural implement defined in claim 1 and which includes a cam track mounted on said stationary portion and extending around the periphery thereof; and a plurality of cam followers mounted on respective ones of said fingers and engaging said cam track to impart said selective linear reciprocal movement to said fingers along said individual longitudinal axes.

3. The agricultaural implement defined in claim 1 in which each of said fingers includes a first shaft-like member mounted for rotational movement in said movable portion and coupled to said chain by said second coupling means, and a second sleeve-like member telescopically mounted coaxial with said first member and mounted for slidable and rotational movement in said movable portion of said head, said second member being coupled to said stationary portion of said head by said first coupling means.

4. The agricultaural implement defined in claim 1 in which said drive means includes a drive shaft rotatably mounted in said stationary portion, a first gear affixed to one end of said drive shaft and engaging said rotatable portion to be rotated thereby, and a second gear affixed to the other end of said drive shaft and engaging said chain to move said chain around said stationary portion of said head as said movable portion of said head is moved about said generally vertical axis.

References Cited

UNITED STATES PATENTS 3,323,599   6/1967   Conner _____ 172—95 X

ABRAHAM G. STONE, *Primary Examiner.*

J. R. OAKS, *Assistant Examiner.*